United States Patent [19]

Styskal et al.

[11] Patent Number: 4,656,734
[45] Date of Patent: Apr. 14, 1987

[54] APPARATUS FOR REPLACEMENT OF GUIDE PINS OF A GUIDING TUBE FORMING PART OF THE TOP INTERNAL EQUIPMENT OF A PRESSURISED WATER NUCLEAR REACTOR

[75] Inventors: Pierre Styskal, Thorens; Laurent Guicherd, Villeurbanne, both of France

[73] Assignee: Framatome & Cie., Courbevoie, France

[21] Appl. No.: 741,916

[22] Filed: Jun. 6, 1985

Related U.S. Application Data

[62] Division of Ser. No. 509,116, Jun. 29, 1983, Pat. No. 4,585,613.

[30] Foreign Application Priority Data

Aug. 6, 1982 [FR] France ................................ 82 13751

[51] Int. Cl.[4] ...................... B23P 19/00; B23P 17/00; G21C 19/00
[52] U.S. Cl. .................................. 29/723; 29/400 N; 376/260
[58] Field of Search ....... 29/400 N, 723, 426.1–426.3; 376/260–264

[56] References Cited

U.S. PATENT DOCUMENTS 3,887,980  6/1975  Yates et al. ............................ 29/723
4,439,905  4/1984  Gourden et al. ....................... 29/723
4,575,930  3/1986  Blickenderfer ........................ 29/723

Primary Examiner—Mark Rosenbaum
Assistant Examiner—Steven Nichols
Attorney, Agent, or Firm—Pollock, Vande Sande & Priddy

[57] ABSTRACT

Apparatus for the replacement of the guide pins of a guide tube of a pressurized water reactor. The apparatus consists of a rod with clamping means at each end which clamps the guide tube and holds the tube while the bolts connections are removed and then imparts a slight vertical movement to release the guide pins of the guide tube.

6 Claims, 12 Drawing Figures

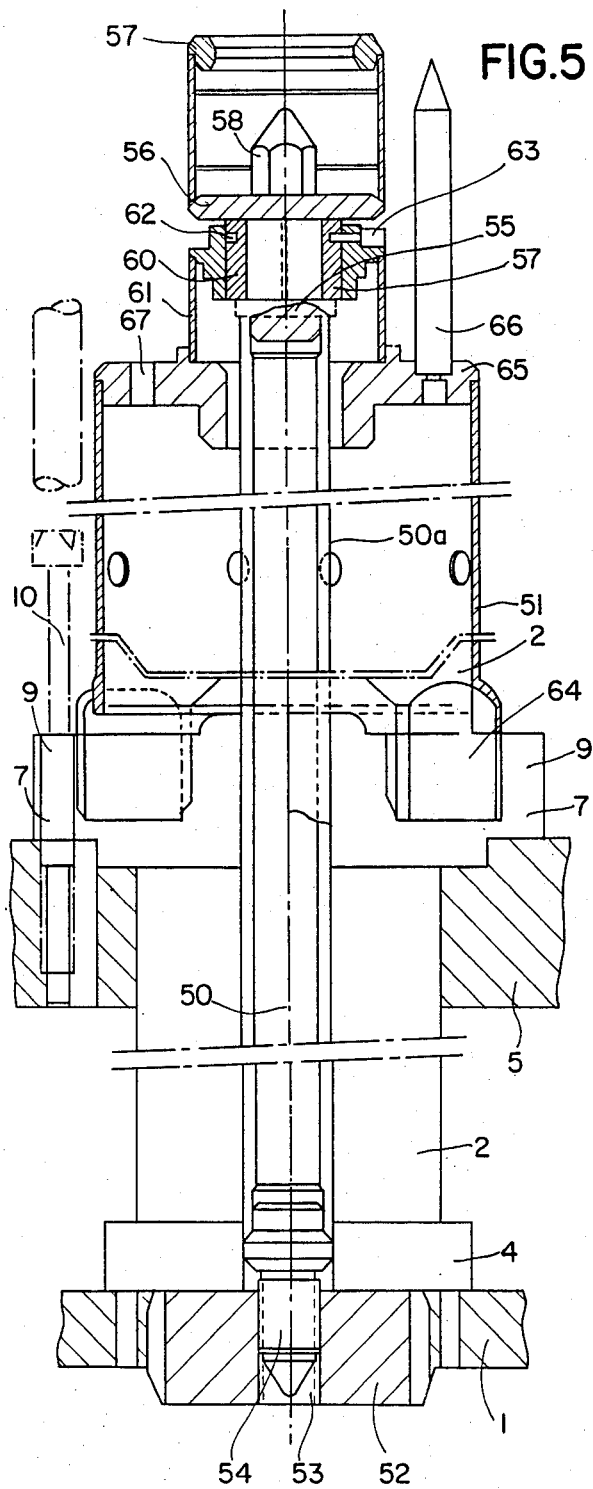
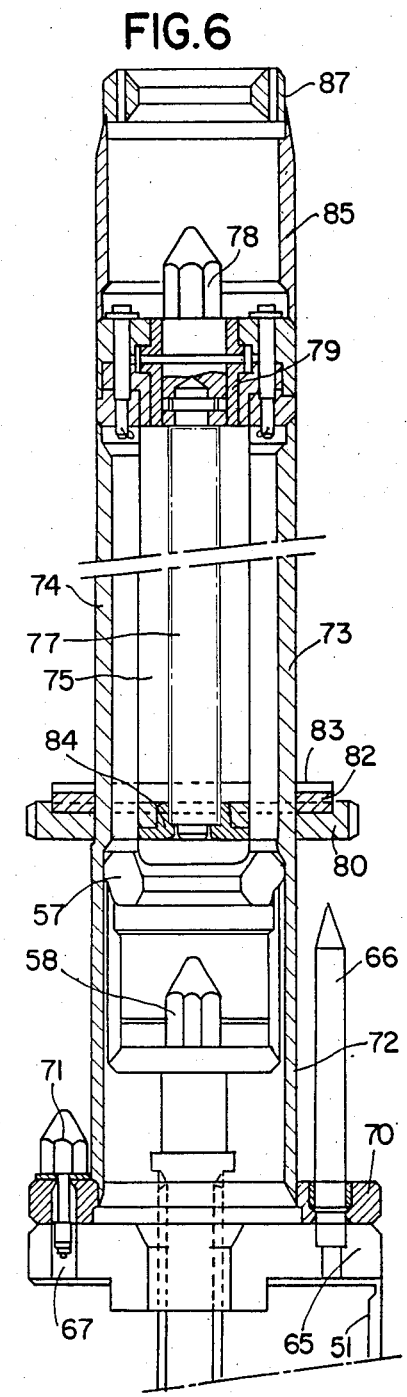

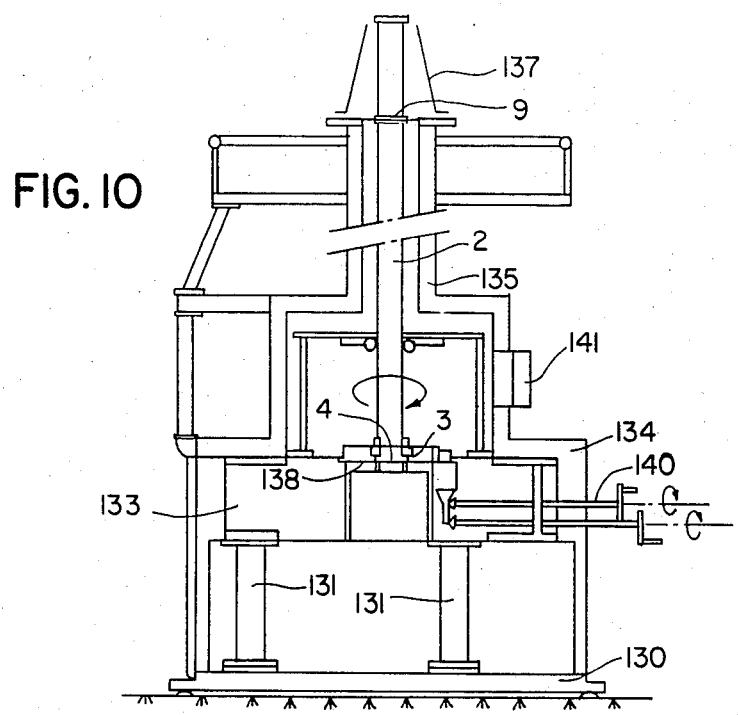
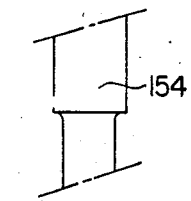
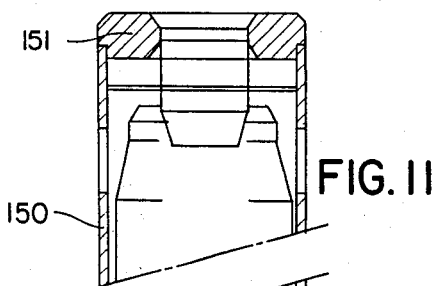
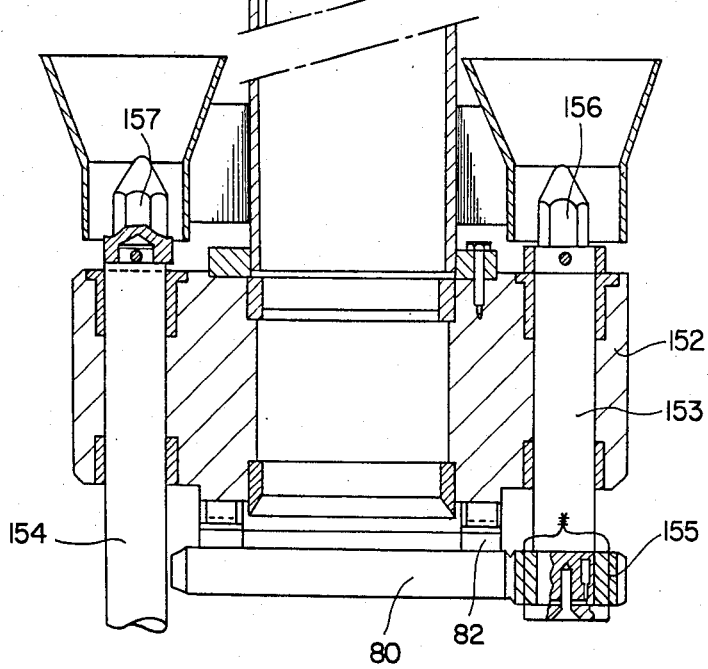
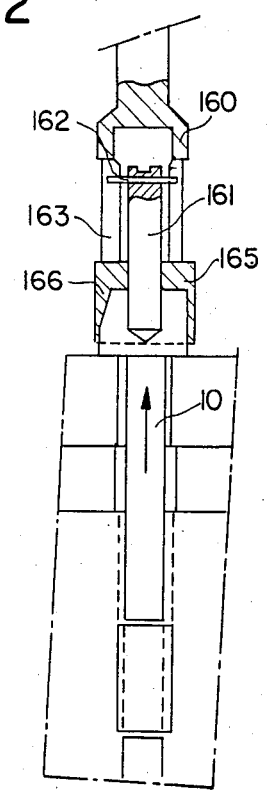
FIG. 10
FIG. 11
FIG. 12

APPARATUS FOR REPLACEMENT OF GUIDE PINS OF A GUIDING TUBE FORMING PART OF THE TOP INTERNAL EQUIPMENT OF A PRESSURISED WATER NUCLEAR REACTOR

This is a division of application Ser. No. 509,116, filed June 29, 1983, now U.S. Pat. No. 4,585,613.

BACKGROUND OF THE INVENTION

The invention relates to a process for the replacement of guide pins of a guiding tube forming part of the top internal equipment of a pressurised water nuclear reactor.

In pressurised water nuclear reactors the top internal equipment of the vessel is disposed above the reactor core, inside the vessel. This top internal equipment includes vertical guiding tubes of great length which permit the guiding of the control rods. These guiding tubes are disposed vertically in line with certain assemblies of the core, in which the control rods are moved in order to control the reactivity of the reactor. These tubes also guide the control rods when they fall, through the action of gravity, to the maximum insertion position inside the assemblies in the event of an emergency shut-down of the reactor.

The guiding tubes are disposed inside a structure consisting of two horizontal plates, one of which, at the bottom of the internal equipment, is composed of the top core plate while the other consists of the support plate for the top internal equipment. These two plates are connected by braces and are provided with apertures for the passage of the guiding tubes, these apertures being in alignment with one another.

The guiding tubes are composed of two independent parts in line with one another in the axial direction, that is to say the vertical direction.

The lower part of these guiding tubes, which comprise in particular the continuous guiding means for the control rods, rests by its bottom end on the top core plate. On the flange constituting the base of this bottom end are fixed guide pins which have a downwardly projecting resilient deformation portion which engages in apertures provided in the top core plate.

The guiding tubes are thus held in a fixed position relative to the top plate and to the reactor core assemblies.

The lower part of the guiding tubes also carries at its top end a flange intended to rest on the support plate for the internal equipment.

The upper part of the guiding tube has at its bottom end a flange which comes to rest on the support plate of the internal equipment, above the flange of the lower part of the guiding tube. The connecting bolts enable the two parts of the guiding tube to be connected to the support plate and to be connected to one another in such a manner as to be in line with one another.

During the refuelling of the nuclear reactor with fuel assemblies and during certain maintenance or repair operations on the reactor, the whole of the top internal equipment is removed from the vessel while the reactor pool and vessel are filled with water, and is disposed in a storage bay in the nuclear reactor pool.

Various inspection and maintenance operations for the internal equipment are possible when this internal equipment is disposed in its storage bay.

In particular, in inspection operations for the top internal equipment, use is made of an inspection machine comprising an ultrasonic detector which can be moved under the internal equipment, at the bottom of the reactor pool, in order to check the guide pins disposed inside the openings in the top plate of the reactor core (Patent FR-A-No. 2.495.816).

It has thus been possible to discover certain defects in guide pins, which may necessitate their replacement.

Hitherto, no processes or apparatus capable of permitting replacement of these guide pins have been known.

The operations of replacement of the guide pins entail, in fact, the complete dismantling of these guide pins, and in particular the complete elimination of the portion of the pin which remains engaged in the bottom flange of the guiding tube.

In certain cases this elimination of the remaining portion of the guide pin can be achieved only by electroerosion.

Moreover, the fastening of a new guide pin requires certain welding operations.

Consequently, these operations cannot be carried out under water in the top internal equipment storage bay.

Furthermore, after a certain period of operation the guiding tubes are contaminated by radioactive products, which prevent any direct intervention on the guiding tube without adequate biological protection or without thorough decontamination of the guiding tube.

Dismantling of the guiding tube entails, in fact, the separation of the two parts of which it is composed, since the connecting bolts join the two parts of the guiding tube together and fasten it on the internal equipment support plate.

When the two parts of the guiding tube are refitted in line with one another, it is very difficult to find once again the absolutely exact previous relative position of the two parts of the guiding tube.

This may result in misalignment, which is increased by the fact that the wear on the guide cards and on the continuous guiding elements of these tubes is not absolutely regular.

After the guiding tubes have been reinstalled, there is therefore still a risk that the internal equipment may no longer permit perfect guiding of the control rods, which is very particularly troublesome in respect of the dropping of these rods under their own weight in the event of an emergency shut-down.

SUMMARY OF THE INVENTION

The aim of the invention is therefore to propose a process for the replacement of the guide pins of a guiding tube forming part of the top internal equipment of a pressurised water nuclear reactor, this top internal equipment being disposed above the reactor core and containing vertical guiding tubes which are of great length for guiding the control rods, which guiding tubes are disposed vertically in line with certain core assemblies and consist of a lower part resting on the top core plate in which are engaged the guide pins fastened to the lower part of the guiding tubes, and of an upper part in line with the lower part and resting on a horizontal support plate connected to the top core plate by braces, the lower part and the upper part of the guiding tubes being independent and connected to the support plate by bolts which also join them to one another, which process permits replacement of the guide pins by a series of perfectly controlled operations while avoiding misalignment of the guiding tube elements effecting the guiding of the control rods.

To this end, the top internal equipment of the reactor is disposed under water in its storage bay, outside the reactor vessel, and the two parts of the guiding tube are joined together by introducing a rod along the axis of the tube and over its entire length and effecting axial clamping of the tube by clamp members on the rod, at each of its ends, each of which clamp members bears against one of the parts of the tube; the bolt connections between the two parts of the guiding tube and the support plate are removed, and the guide pins of the tube are extracted from their sockets in the top core plate by effecting a slight vertical displacement of the guiding tube;

the entire guiding tube is taken up by a handling and transport means, while the two parts of this guiding tube are fastened together by means of the rod and the clamp members;

the guiding tube is decontaminated;

it is transported to a dry treatment bay in which the guide pins fastened to the lower part of the guiding tube are replaced;

the guiding tube is transported to the underwater storage bay for the internal equipment and is replaced in position in the internal equipment with the aid of the handling and transport means;

the guide pins are inserted into their sockets in the top core plate by a thrust applied to the guiding tube, and the two parts of the guiding tube are bolted to the support plate;

and finally the rod and the clamp members are removed from the two parts of the guiding tube.

The invention also relates to apparatus enabling the operations of replacement of the guide pins to be carried out.

BRIEF DESCRIPTION OF THE DRAWINGS

In order to enable the invention to be clearly understood, a description will now be given, as a non-limitative example and with reference to the accompanying drawings, of the tools required for the operations of replacing the guide pins of the guiding tubes in a pressurised water nuclear reactor, and also of these replacement operations themselves.

FIG. 5 is a view in section through a vertical plane of symmetry of the apparatus used for fastening together the two parts of a guiding tube.

FIG. 6 is a view in section through a vertical plane of symmetry of the apparatus used for positioning the tools on the guiding tube.

FIG. 10 shows the dry treatment bay for the guiding tube, in which the replacement of the guide pins is effected.

FIG. 11 is a view in section through a vertical plane of symmetry of the tools used for crimping locking caps for the guiding tube fastening bolts.

FIG. 12 is a detail view of the end of the bolt cap crimping tool.

DETAILED DESCRIPTION

Figure 1:
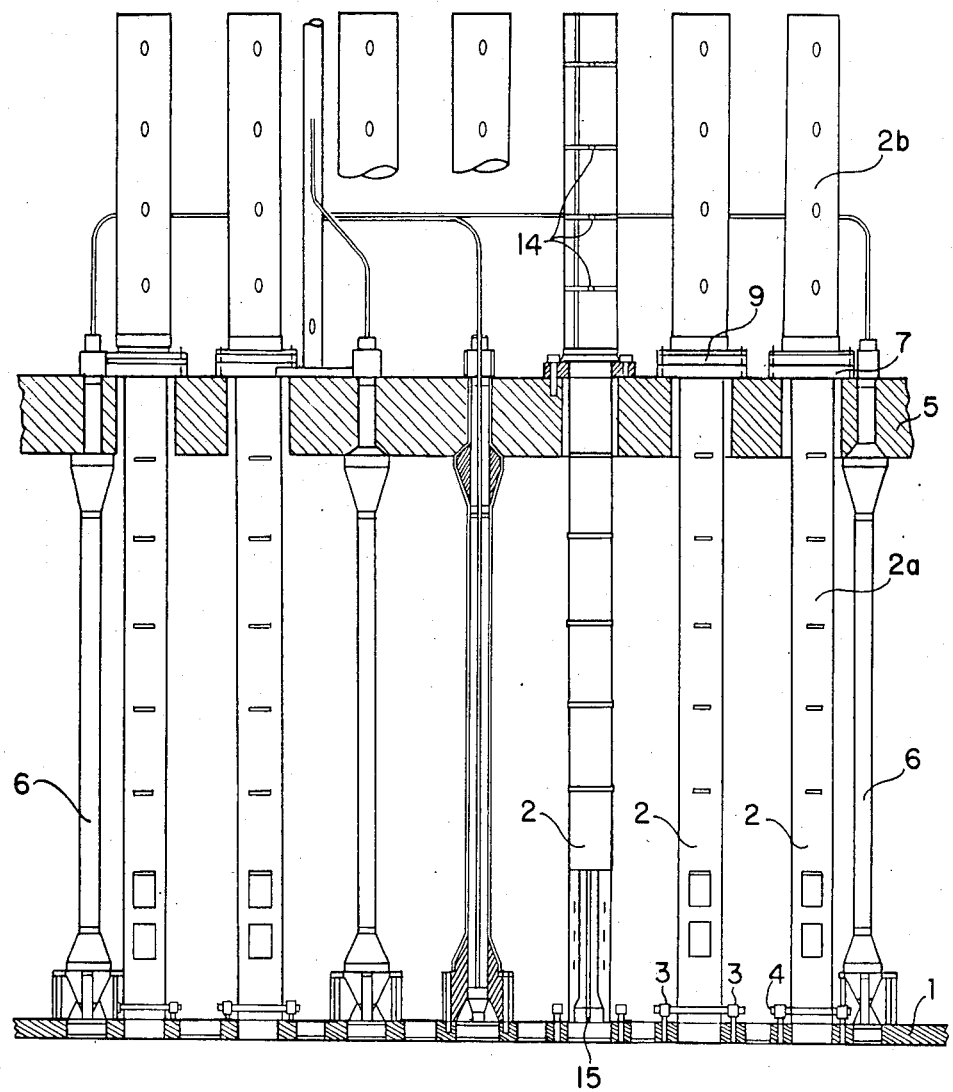
FIG. 1 is a view in elevation of the top internal equipment of a pressurized water nuclear reactor.

FIG. 1 shows the top internal equipment of a nuclear reactor, including, at the bottom, the top core plate 1 on which is disposed a guiding tube assembly 2 in which the guide pins 3 are fastened to the bottom flange 4 of the guiding tube and are engaged in openings in the core plate 1.

Each guiding tube is provided with two diametrically opposite guide pins 3.

The support plate 5 of the internal equipment is fastened by means of braces or support pillars 6 at a certain distance from the top core plate 1.

Each of the guiding tubes 2 comprises a lower part 2a and an upper part 2b.

The part 2a has a bottom flange 4, in which the guide pins 3 are fixed, and a top flange 7 resting on the top internal equipment support plate 5.

The upper part 2b of the guiding tube is provided with a bottom flange 9 resting on the flange 7.

Figure 2:
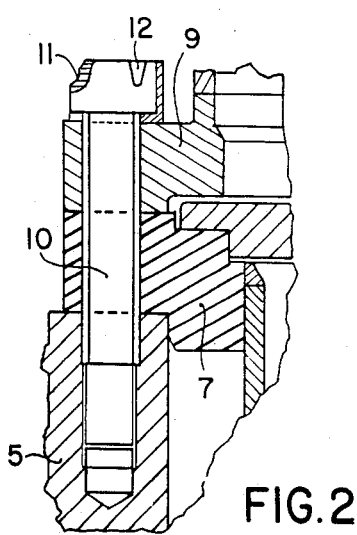
FIG. 2 shows on a larger scale a detail from FIG. 1.

In FIG. 2 it can be seen that the flange 7 and the flange 9 are joined together and fixed on the support plate 5 by a bolt 10, which is rotationally locked by means of a cap 11 welded on the flange 9 and crimped inside sockets 12 machined in the head of the bolt 10.

Inside the guiding tubes are disposed guide cards 14 which are spaced apart evenly over the length of the tube and comprise guide elements for the absorbent elements constituting the control rod.

The guide cards 14 occupy the entire length of the part 2b of the guide tube and also the major part of the length of the part 2a.

The bottom part of the guiding tube is occupied by continuous guiding members 15 disposed in a network reproducing the network of the control rod bundle.

Vertically in line with the guiding tubes 2, and below the top core plate 1, are disposed the assemblies inside which the control rods are moved.

Figure 3:
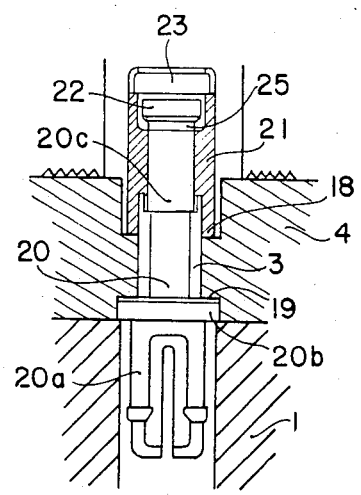
FIG. 3 shows in a view on a larger scale a part of FIG. 1, showing a guide pin of a guiding tube.

In FIG. 3 can be seen a guide pin 3 permitting the guiding and fastening of a guiding tube on the top core plate 1.

The pin 3 is fastened on the bottom flange 4 of the guiding tube inside a socket comprising a central portion of small diameter and two end portions of larger diameter, separated by shoulders 18 and 19.

The guide pin is composed of a body 20, a nut 21, a stop key 22, and a locking pin 23.

The body 20 comprises a lower part 20a consisting of a split sleeve of elastic material which is fastened by elastic locking inside the opening 24, the diameter of the lower part of the sleeve 20a being very slightly larger than the diameter of the opening 24.

The sleeve 20a ends in a widened portion 20b bearing against the shoulder 19 of the opening made in the flange 4.

The upper part 20c of smaller diameter of the body of the guide pin is provided at the top with a slot 25, inside which the stop key 22 is placed. This part 20c has a threaded portion onto which is screwed the nut 21, which at the end of the screwing movement comes to bear on the shoulder 18.

Before the guide pin is fastened by screwing, the slot in the sleeve 20a is oriented in relation to the top core plate 1, and during the screwing this position of the slot, corresponding to a position of the body 20 of the guide pin, is maintained, whereupon the parts are fastened in respect of rotation and made watertight by welding together the pin 23 and the stop key 22.

The pin 23 is engaged in openings in the top of the nut, so that the latter is rotationally locked relative to the key 22 and to the body 20 in which the key 22 is engaged.

The top face of the nut 21 is open, so that the welding of the pin 23 to the key 22 can be effected from the top of the guide pin.

Figure 4:
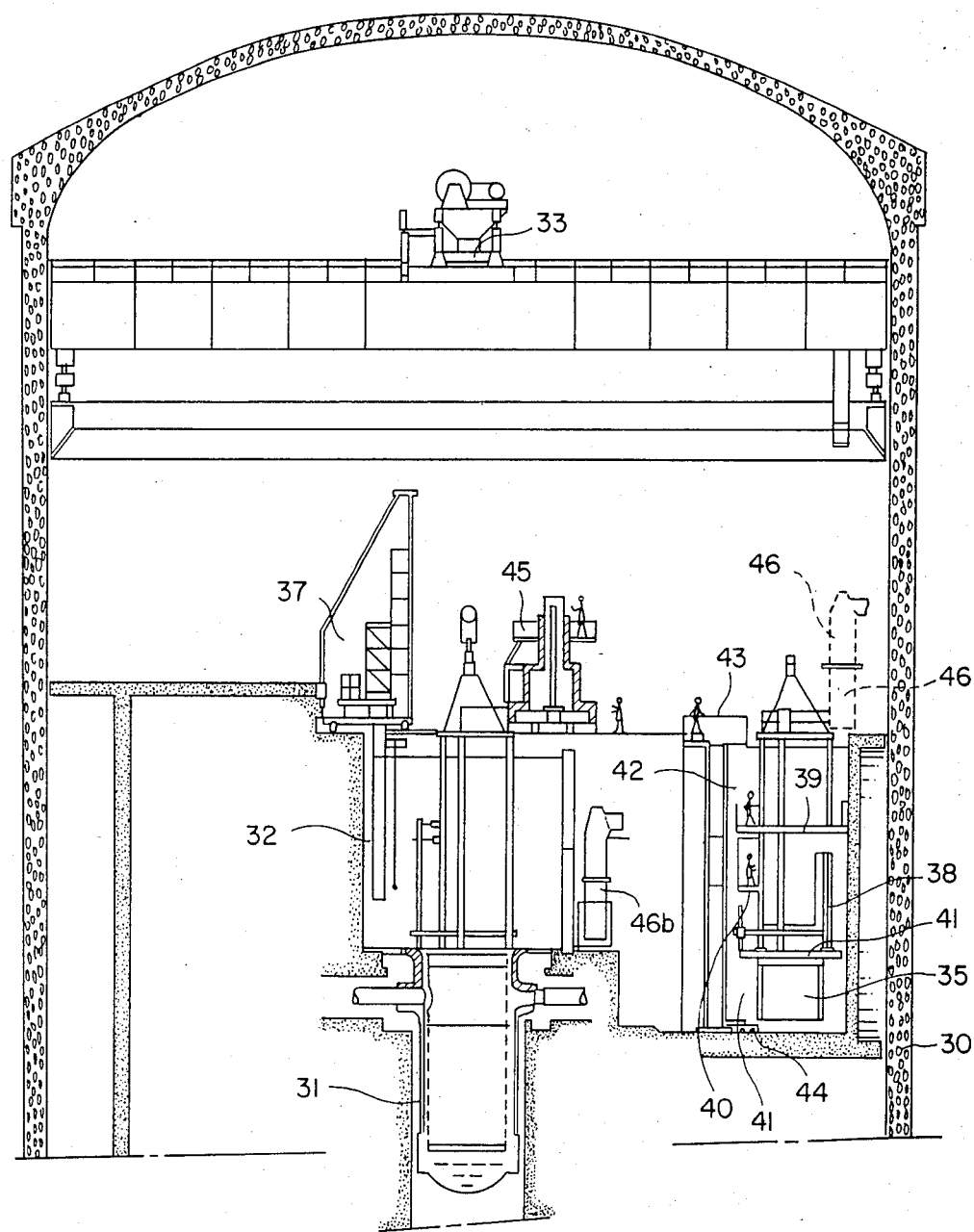
FIG. 4 is a diagrammatical general view of the nuclear reactor in the shutdown state, the reactor vessel and pool being filled with water, and certain apparatus required for the replacement of the pins being in the operative position above the storage bay for the top internal equipment.

In FIG. 4 can be seen the safety containment 30 of a pressurised water nuclear reactor, inside which containment is disposed the vessel 31 which at the top leads into the interior of the reactor pool 32.

The nuclear reactor is shown in FIG. 4 in a shutdown phase in which the reactor vessel is open, the pool and the vessel being filled with water.

With the aid of the rotating overhead crane 33 of the reactor, it is then possible to place the top internal equipment of the reactor in its storage bay 34, on a support 35 resting on the bottom of the reactor pool.

A fuelling machine 37 can then refuel the reactor core.

A large number of the operations required for the replacement of the guide pins will be carried out with the internal equipment in the storage position in the bay 34.

For this purpose, a structure 38 comprising two work floors 39 and 40 at different heights are then placed on the internal equipment support 35, one or the other of these floors being used depending on the height of the water in the reactor pool.

The structure 38 comprises four pillars 41 resting on the support 35 and carrying at the top a horizontal circular rail on which the top floor 39 can turn.

An operator can control the turning of the floors from the top floor 39 with the aid of a simple handwheel which, by means of a kinematic chain, rotationally drives running rollers fastened to the floor 39 and resting on the horizontal rail.

The top floor 39 has a radially directed rectangular cutout which, as the result of the turning of the floor, permits access from above to the guiding tube assembly of the internal equipment disposed in the storage bay.

Intervention tools are disposed in a fixed position on the work floor for operations on the guiding tubes.

A hoist cradle 40 can be introduced into the opening in the floor 39 for the purpose of working at a lower level, depending on the height of the water in the reactor pool.

FIG. 4 also shows a well 42 making it possible for a carriage 44 to be lowered to the bottom of the reactor pool, under the top internal equipment, the precise movements of this carriage being controllable from the platform 43 and being monitored by a television camera.

Equipment of this kind is known (Patent Fr-A No. 2.495.816) in the operation of nuclear reactors, and is usually employed for examining the guide pins of the guiding tubes from the bottom of the pool, that is to say underneath the top core plate.

For this purpose, the displacement carriage 44 carries an ultrasonic monitoring device.

It will be seen subsequently that within the framework of the process according to the invention this carriage enables another function to be served.

The apparatus shown in FIG. 4 also contains a guiding tube dry treatment bay or hot stand 45 and a transport and rinsing hood 46 able to contain a guiding tube, which can thus be transported to a decontamination station and to the hot stand.

In FIG. 5 can be see all the apparatus making it possible to join together the two parts of the guiding tube before its removal.

FIG. 5 shows this apparatus in position on a guiding tube 2 comprising a bottom flange 4 and two middle flanges 7 and 9 resting on the support plate 5. All these elements are shown very diagrammatically. Some parts of the apparatus and of the tube have been shown with part of their length cut out in order to permit easier representation of these very long elements.

The apparatus is composed of a central rod or mandrel 50 of great length, a cylindrical cover 51 coaxial with the rod 50, and a shoe 52; the cover 51 and the shoe 52 constitute the clamping members of the apparatus, bearing against the guiding tube.

The mandrel 50 has a tubular central portion 50a which at the bottom is fastened to a screw 54 whose thread corresponds to the tapping of a central opening 53 provided in the shoe 52.

The tubular portion 50a of the mandrel 50 is fastened at the top to an end cap 55 the top 56 of which is connected to a lifting ring 57 and carries a prismatic profiled portion 58 of hexagonal section. The central portion 60 of the cap 55 constitutes a plain bearing in conjunction with an extension 61 of the cover 51, and the mandrel 50 is thus mounted for rotation relative to the cover 51.

A groove 62 inside the central portion 60 of the cap 55 and screws 63 passing through the part 61 of the cover make it possible to hold the mandrel 50 in a fixed position relative to the cover 51.

The cover 51 is of sufficient length to enclose the entire upper part of the guiding tube as far as the flange 9.

The bottom of this cover is provided with a profiled base 64 capping the flange 9 and bearing against the latter by its inner surface.

The base 64 comprises four parts, between which skew notches permit access to the four bolts 10 joining the flanges 7 and 9 to the support plate 5.

The plate 65 at the top of the cover, carrying the end member 61, also carries centring and positioning studs, such as 66. Two tapped holes 67 are provided in the plate 65.

With the aid of the fuelling machine crane of the reactor, whose hooking device is fixed to the lifting ring 57, the whole apparatus is brought into position inside a guiding tube of the internal equipment inside the storage bay in the reactor pool.

The mandrel 50 penetrates axially into the interior of the guiding tube, its bottom threaded end assuming a position in which it projects slightly below the bottom flange 5 resting on the top core plate 1.

With the aid of the carriage 44 of the apparatus described with reference to FIG. 4, the shoe 52 is then brought into a central position relative to the guiding tube.

A tool is then engaged on the profiled top 58 of the mandrel, in order to screw its bottom end 54 inside the tapped hole 53 in the shoe 52.

In this way the two parts of the tube are clamped one against the other, the cover fastened to the top of the mandrel 50 bearing against the flange 9 of the upper part of the guiding tube.

The two parts of the guiding tube have then been joined together with the aid of the apparatus shown in FIG. 5. The axial clamping of the two parts of the guiding tube is effected by an operator from the platform 39 disposed above the internal equipment in its storage bay.

In FIG. 6 it is possible to see the device permitting the vertical displacement and the orientation of the tools, this device being positioned on the apparatus shown in FIG. 5.

FIG. 6 also shows the top part of the apparatus, comprising the ring 57, the nut 58 and the plate 65.

The device for the vertical displacement and orientation of the tools is placed in position on the plate 65, its bottom flange 70 being provided with openings in which are engaged the studs 66 for the centring and positioning of the device shown in FIG. 6 on the cover 51 of the apparatus shown in FIG. 5.

Bolts 71 engaged in the tapped holes 67 make it possible to fasten the tool displacement device on the cover 51.

The device comprises a tubular lower portion 72 connected to two cylindrical wall portions 73 and 74 in the upper part, leaving between them an axially directed passage 75 inside which is disposed a screw 77 of great length, which is connected at the top to a nut 78 and is mounted for rotation with the aid of a plain bearing 79 inside the tubular body of the device.

An assembly comprising a gear 80 and a support 82 is mounted for translatory movement relative to the tubular body of the device.

The peripheral portion of the gear 80 of the support 82 surrounds the tubular portions 73 and 74, while the central portion of these members 80 and 82 passes through the opening 75.

In this way, the members 80 and 82 are locked rotationally relative to the tubular body of the device but are movable in axial translation.

In its central portion the gear 80 is fastened to a nut 84 in engagement with the screw 77.

Turning the screw 77 by means of the nut 78 therefore permits either upward or downward displacements of the gear 80 of the support 82.

The top surface of the support 82 is provided with sockets 83 for the precise angular positioning of a tool which rests on the support 82, and which will be described later on.

At the top the tubular casing of the device is connected to a tubular extension 85 carrying at the top a lifting ring 87 for the transport of the device and for placing it in position on the cover of the guiding tube assembly apparatus.

The support 82 and the gear 80 are adapted to move axially over the entire length of the screw 77, driving in their vertical movement a tool carried by the support 82.

Figures 7, 8:
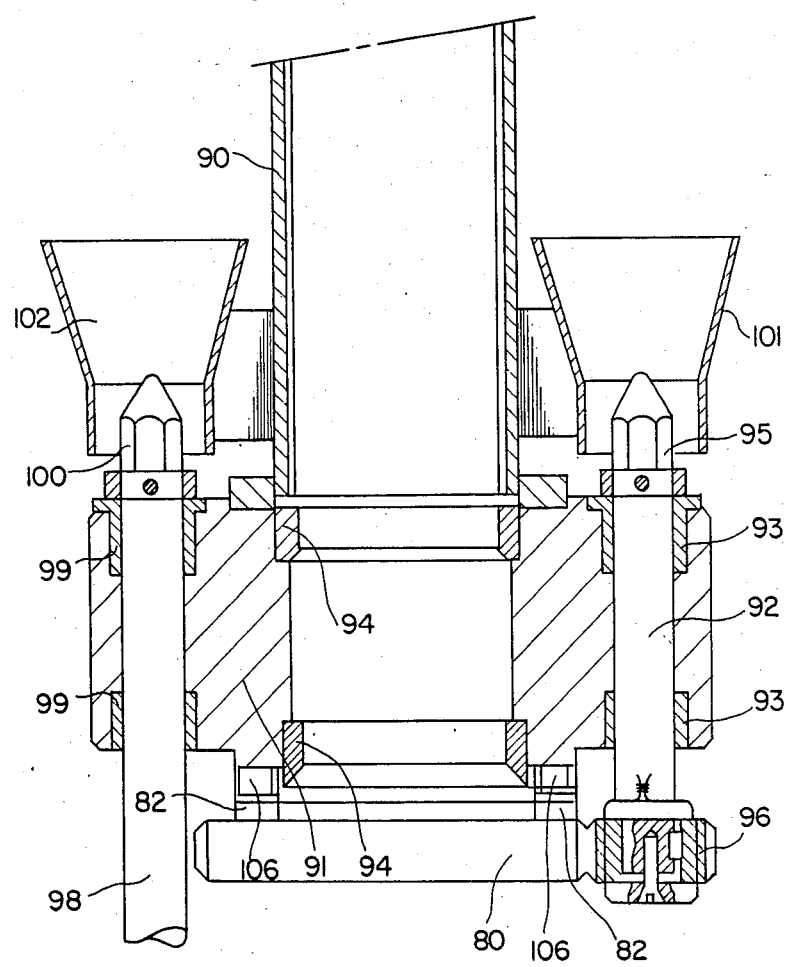
FIGS. 7 and 8 show in a view in section through a vertical plane of symmetry the tools used for removing and placing in position the connecting bolts between the two parts of the guiding tubes and the support plate.

In FIG. 7 can be seen a tool of this kind, which comprises a tubular body 90 capping the part of the vertical displacement device shown in FIG. 6 as far as the support 82 of the gear 80, which support is shown diagrammatically in FIG. 7.

The tubular body 90 is fastened at the bottom to a thick flange 91, inside which is mounted for rotation, with the aid of plain bearings 93, a vertical shaft 92 fastened at the top to a nut 95 serving to rotate it and at the bottom to a pinion 96 meshing with the gear 80 when the tool is in position on the vertical displacement device.

The flange 91 is also provided on its internal surface with rings 94 enabling the flange 91 and the tubular tool body 90 to be mounted for rotation on the tubular body of the device for the vertical displacement of the tool.

The thick flange 91 also carries a tool shaft 98 of great length, the lower part of which is shown in FIG. 8.

This tool is mounted for rotation about its axis in the flange 91 with the aid of plain bearing rings 99. At the top, the shaft 98 is fastened to a profiled part 100 for its rotation.

Frustoconical guides 101 and 102 make it possible to guide the operating spanner manipulated by the operator from the platform disposed above the upper internal equipment, so as to engage it on the nuts 95 and 100 respectively and to turn the pinion 96 and the tool 98 respectively.

At the top, the tubular body 90 of the tool is fastened to a lifting ring 104 for the transport and positioning of the tool on the device for the vertical displacement of the tool.

When the device is in position, the ring 91 rests on the support 82 with the aid of fixed support trunnions 106 positioned in the sockets 83 in the support 82. In this way the position of the tool can be accurately fixed angularly relative to the position of the tool displacement device and of the guiding tube.

The turning of the shaft 92 by means of the nut 95 while the pinion 96 meshes with the gear 80 permits the displacement and the precise positioning of the tool 98 above the guiding tube connecting bolts 10, and this tool can then be lowered onto these bolts, into the tightening or untightening position, with the aid of the device shown in FIG. 6 for the vertical displacement of the tool.

In FIG. 8 can be seen a bolt 10 connecting the flanges 7 and 9 of a guiding tube to the support plate 5, this structure being identical with that shown in FIG. 2.

At the bottom the tool shaft 98 forms a socket 107, the bottom part of which is cut out to form resilient claws 108 adapted to engage over the bolt head 11 and grip the latter.

Inside the socket 107 is mounted a profiled member 109 fastened to a pin 110 mounted in slots 111 provided in the socket 107.

The profile of the member 109 corresponds to the inside profile of the bolt head 11.

The tool can therefore effect through rotation the tightening or untightening of the bolt 10 when the member 109 of hexagonal section is engaged in the bolt head 11. This member 109, engaged in an opening of hexagonal section in the socket 107, is in fact rotationally fixed to the socket 107 and to the shaft 98. A pin 110 enables the member 109 to be held in the socket 107.

The member 109 is also able to make a translatory movement inside the socket 107 when the tool shaft 98 makes a downward movement. After the bolt 10 has been unscrewed, the end of the socket 107 provided with the claws 108 can thus be moved downwards to enable these claws to engage over the bolt head.

The bolt can then be transported to a bolt storage zone, for example a barrel fastened to the cover 51.

The unscrewing and the removal of the four bolts fastening the tubes 10 on the support plate of the top internal equipment can thus be effected in succession.

Figure 9:
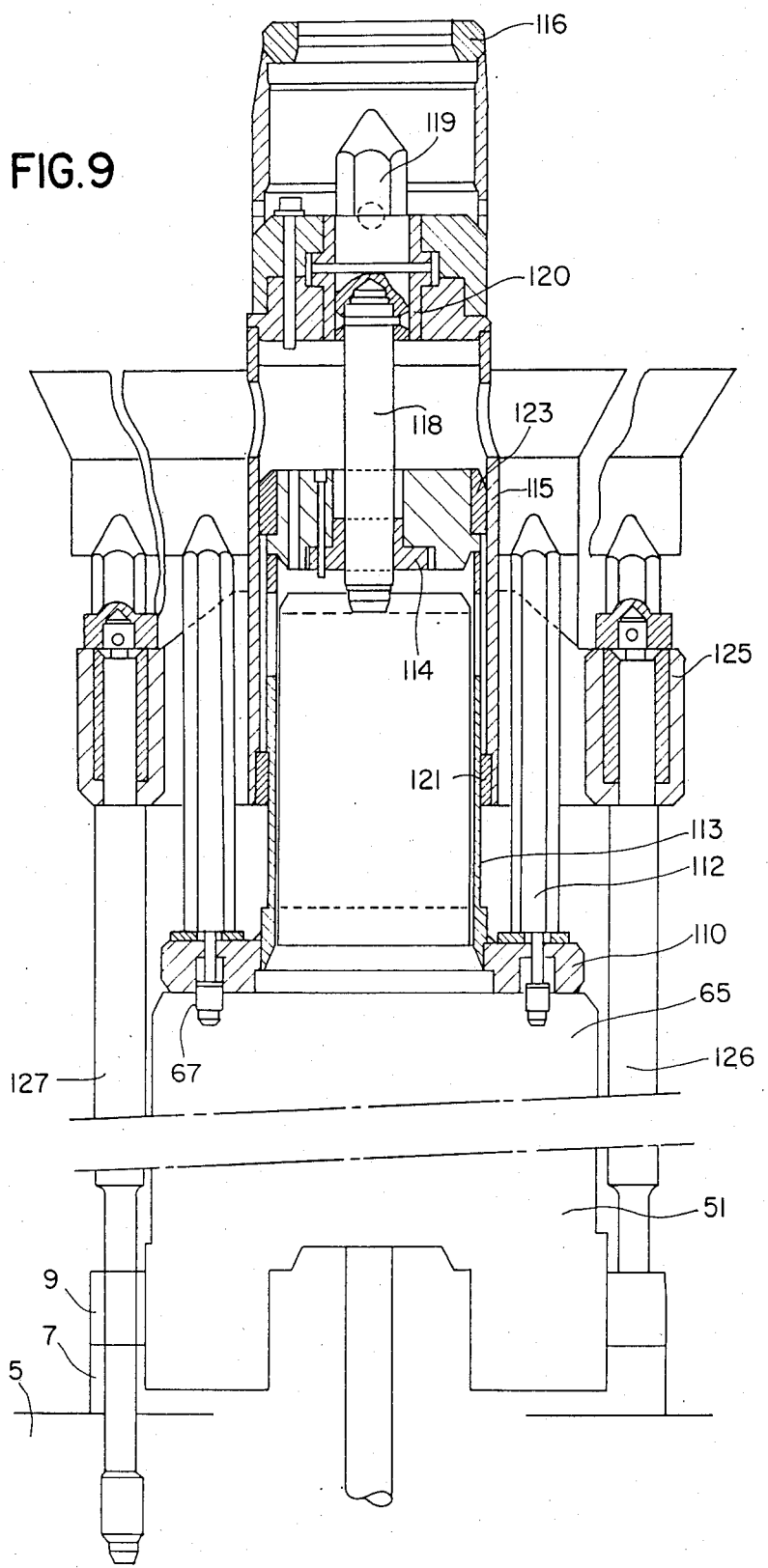
FIG. 9 is a view in section through a vertical plane of symmetry of the tools used for the extraction and insertion of the guide pins from and into their sockets in the top core plate.

FIG. 9 shows a device permitting the vertical displacement of the guiding tube for the extraction (or conversely for the insertion) of the guide pins of the guiding tube from (or into) their sockets by vertical displacement of the guiding tube assembled with the aid of the device shown in FIG. 5.

The device is placed on the top plate 65 of the cover 51, connecting bolts 112 being received in the tapped holes 67 in the plate 65.

The extraction device comprises a first tubular body 113 fastened at the top to a nut 114 and at the bottom to the flange 110. It also comprises a second body 115, the top of which is fastened to a lifting ring 116 for the transport and positioning of the extraction device.

Inside the body 115 is mounted a screw 118 fastened at the top to a profiled nut 119 and mounted for rotation inside the body 115 by means of a bearing 120.

The body 113 is mounted for translatory movement inside the body 115 with the aid of a fixed sliding ring 121 mounted inside the body 115 and a sliding shoe 123 mounted on the body 113.

The body 115 is fastened to a thick flange 125 inside which very long screws 126 and 127 are mounted for rotation.

The position of these screws 126 and 127 enables them to be placed in position by screwing inside two screw holes in the flanges 7 and 9 and in the support plate 5.

After the four bolts 10 have been unscrewed from the tube 8, a tool of the same type as that shown in FIGS. 7 and 8 is in fact used for inserting and fixing guide studs inside two screw holes.

The other two screw holes remain free for the introduction of the screws 126 and 127, thus permitting the centring of the extraction device on the guiding tube.

The turning of the screw 118 by means of the profiled nut 119 by the action of the operator from the platform permits the upward displacement of the support 113 relative to the support 115, thus permitting a vertical displacement of slight amplitude of the guiding tube assembled with the aid of the mandrel and cover device, and enables the guide pins fastened to the lower flange to be extracted from their sockets in the top core plate.

The guiding tube is then completely free relative to the internal equipment.

It is then possible to proceed to place it inside a transport hood, such as the hood 46 shown in FIG. 4, by connecting the lifting ring fastened to the top of the cover 51 to a lifting winch disposed inside the hood 46.

The hood is then transported with the aid of the rotary crane of the power station to a station above the reactor pool.

The hood is connected to a demineralised water pipe which feeds internal rows of nozzles distributed over the height of the hood, thus permitting a first washing.

The hood is then brought to a decontamination station 46b for more complete decontamination of the guiding tube (FIG. 4). This decontamination station 46b, at the bottom of the pool, is connected to electric and hydraulic connection devices permitting ultrasonic cleaning treatment of the guiding tube, particularly of its lower part containing the continuous guiding devices.

After drying, the guiding tube can be transported to the dry treatment zone or hot stand 45 shown in FIG. 4.

FIG. 10 shows in greater detail the hot stand with the guiding tube 2 in position for treatment inside the stand.

This hot stand comprises a base 130 resting on the reactor structure, pillars 131 supporting a frame 133, and biological protection members 134 enabling an operator to work near the stand without risk of irradiation. The hood, which is in two parts, rests on the frame 133 of the hot stand. The lower part remains in position on the hot stand during the changing of the guide pins, while the upper part is removed. Access is thus obtained to the bolt caps for the purpose of replacing them if required.

The lower part of the guiding tube, provided with the bottom flange 4 in which the guide pins 3 are fixed, rests on the table 138, which can be rotated with the aid of a crank drive 140.

An insulating porthole 141 enables the operator to see the working zone on the guiding tube 4.

All around the rotating table 138 are disposed tools permitting the replacement of the guide pins by successive operations. The various tools are placed on a fixed plate, in successive angular positions around the guiding tube. By rotating the table 138, it is thus possible to bring each of the two guide pins 3 into position in front of each of the operating stations.

The various operations can be followed by the operator, because the front part of the wall 134 containing the portholes 141 can be oriented around the vertical axis of the dry treatment station.

The tools disposed inside the dry treatment station comprise spark machining equipment making it possible to apply electroerosion to the pin 23 of the key 22 and to the part 20c of the body of the threaded guide pin 20 joined to the nut 21 (these parts of the guide pin are shown in FIG. 3).

A water cooling tank is disposed around the guide pin nut during this electroerosion operation.

Through the rotation of the table after the electroerosion operation, the guide pin is passed to a dismantling station in which a gripping tool enables the pin and the nut, which have been separated by electroerosion, to be removed and deposited in a sealed container for their evacuation.

The guiding tube is then turned in order to bring the opening for the guide pin which has just been removed to a cleaning and inspection tool comprising two closure members for the pin passage hole and a rotating pipe provided with water spray nozzles which is adapted to penetrate inside the pin passage holes in order to clean the surface of the latter.

After this operation, cameras permit visual inspection of the condition of the hole.

Through the rotation of the guiding tube, the pin socket is then brought in front of a tool fitting a new pin. A gripper tool and a spanner permit the introduction of the pin body, the orientation of the slot in its lower part relative to the bottom flange 4 of the guiding tube, and the presentation and tightening to the desired torque of the nut provided with the key and the pin 23.

Through a further rotation, the new pin is brought into position in front of a welding station equipped with an MIG (metal inert-gas) welding torch.

This welding apparatus comprises a means of orientation of the torch enabling the pin 23 and the key 22 to be welded to one another whatever the relative orientation of these two members, which may be oriented in any position relative to one another after the tightening of the nut 21.

While the guiding tube 4 is in position in the dry treatment zone, some verifications are made, in particular verification of the condition of the deformable caps welded on the top face of the flange 9, at the bottom end of the upper part of the guiding tube.

This part of the guiding tube is accessible directly from the top of the dry treatment station when the cover member 137 is lifted.

This part of the tube is in fact only very slightly irradiant and an operator can intervene directly to check the condition of the caps which were deformed in the extraction of the bolts 10.

Certain checks are also made on the top internal equipment which has remained in its storage bay in the reactor pool. In particular, the bores in the top core plate which receive the deformable portions of the pins are checked with a camera, and the dimensions of the bores are checked by passing check gauges through them.

If necessary, reboring of the plate is effected.

The tapped holes formed in the support plate 5, which are intended to receive the guiding tube fastening bolts, are also checked.

In order to bring the guiding tube into position in the top internal equipment, it is transported with the aid of the transport hood, which makes it possible to wash the guiding tube by passing it through a washing station.

With the aid of the transport hood winch, the guiding tube, centred on the guide studs, is placed on the top core plate with the aid of its resilient pins.

The extraction tool shown in FIG. 9 is then placed in position on the cover 51 of the guiding tube support apparatus, the screws 126 and 127 taking up position in two tapped holes, and this tool is operated oppositely to the extraction movement with the aid of the nut 119 and the screw 118, so as to apply a thrust to the guiding tube and thus permit the insertion of the guide pins into their socket in the top core plate.

The screwing and unscrewing tool shown in FIGS. 7 and 8 is then used to replace and tighten the bolts 10.

The heads of these bolts are then inside the caps, which must be deformed by crimping inside sockets provided in the bolt head.

In order to carry out this operation, use is made of the device shown in FIGS. 11 and 12.

This tool is intended to be placed on the device for the vertical displacement of the tools which are shown in FIG. 6.

The crimping tool has a construction rather similar to that of the screwing and unscrewing tool, and it comprises a tubular body 150 fastened at the top to a ring 151 and at the bottom to a flange 152 carrying two rotating shafts 153 and 154. The shaft 153 carries a pinion 155 meshing with the gear 80 of the device for vertical displacement of the tools. The bottom of the thick flange 152 rests on the support 82 of the device for the vertical displacement of the tools.

Profiled nuts 156 and 157 make it possible to drive rotationally the shafts 153 and 154 respectively from the floor 39 with the aid of a spanner operated by an operator.

The rotation of the nut 156 and shaft 153 enables the flange 152 and the tool 154 to be accurately positioned angularly relative to the guiding tube bolts.

In FIG. 12 can be seen the lower part of the tool fastened to the shaft 154 and provided with a socket 160, inside which is mounted a profiled member 161 adapted to perform a limited movement of translation relative to the socket 160 with the aid of a pin 162 engaged in slots 163 in the socket 160.

The member 161 is returned to the bottom position when the tool is not engaged on the bolt head.

The lower part of the socket 160 constitutes a crimping tool 165 comprising three profiled parts 166 disposed at angles of 120°, for forcing the metal of the cap into the sockets in the bolt head.

When the tool has been lowered by blows onto the bolt head, the member 161 comes into engagement in the bolt head and effects the centring of the tool, whose bottom part 165 engages over the cap in such a manner that the part 166 forces the metal into the sockets in the bolt head.

Three crimpings of the cap at 120° are thus made, thereby rotationally fixing the guiding tube fastening bolts.

The operations can be carried out in succession on all the guiding tubes in which it is desired to replace the guide pins, by repeating the operations described above for one guiding tube.

It can be seen that the principal advantages of the apparatus according to the invention consists in making it possible to replace the guide pins under very good conditions in respect of facilities for checking the operations carried out in the dry treatment zones, while avoiding all risk of contamination and all risk of relative displacement of the guide elements of the guiding tubes.

After these operations of replacing the guide pins, the structure therefore permits perfect guiding of the control rods.

Furthermore, the fact that the guiding tube is brought to a dry treatment zone makes it possible to carry out all checks and any repairs that may be found necessary.

These checks and repairs would not be possible if the operations were carried out under water.

Moreover, when the process according to the invention is applied, there is no risk of pollution of the reactor pool water by metallic debris produced by operations carried out on the guiding tubes.

The process and the apparatus according to the invention therefore make it possible to replace a very large proportion of the guide pins of the guiding tubes of the internal equipment of a nuclear reactor, and even optionally all the guide pins.

The invention is not limited to the embodiment which has just been described; on the contrary, it includes all variants thereof. Thus, the two parts of the guiding tubes can be joined together in a different manner from that described, in which use is made of a mandrel mounted for rotation in a cylindrical cover and having a threaded end onto which a shoe screws.

It is possible to conceive a different type of fastening using a rod passing axially through the guiding tube, and on the ends of which are fastened the clamp members bearing against the ends of the guiding tube.

Any maintenance and repair operations can be carried out in the dry treatment zone, without being limited to the operations which have been described.

The various tools used may be of different forms of construction from those described.

Finally, the process and the apparatus according to the invention can be used for replacing component parts of a subassembly of a nuclear reactor, where the mounting of this subassembly on the reactor equipment is similar to the mounting of a guiding tube in the top internal equipment of the reactor.

We claim:

1. Apparatus for replacement of the guide pins (3) of a guiding tube (2) forming part of the top internal equipment of a pressurized water nuclear reactor, comprising:
   (a) means for fastening two parts of said guiding tube, comprising a rod (50) of great length and two end members (51, 52), of which at least one (52) is removable and which are movable in the axial direction relative to one another by rotationally operating said rod (50);
   (b) a device for the vertical displacement of tools, adapted to be operated manually from a distance and detachably supported on said guiding tube fastening means;
   (c) a screwing and unscrewing tool adapted to be operated from a distance and detachably supported on said device for the vertical displacement of tools;
   (d) a manually operated extraction and thrust device mounted detachably on said guiding tube fastening means;
   (e) a dry treatment station adapted to receive said guiding tube and having a radiation insulating wall; and
   (f) a crimping tool mounted detachably on said device for the vertical displacement of tools and comprising a head adapted to be accurately oriented and to be operated from a distance.

2. Apparatus for the replacement of guide pins according to claim 1, characterised by the fact that the apparatus fastening together the two parts of the guiding tube comprises a mandrel (50) of great length, which is mounted for rotation inside a cylindrical casing or cover (51), of a diameter and length greater than the diameter and the length of the upper part (2b) of the guiding tube and having a bottom portion for applying the inner surface of the cover (51) against the bottom end of the upper part (2b) of the guiding tube, the mandrel (50) being of a greater length than the guiding tube (2) and having a threaded bottom portion (54) for engagement in a clamp shoe (52) by being brought into contact with the bottom end of the guiding tube (2), the other end of the mandrel (50) being provided with a means (58) for rotating it for the purpose of screwing it into the clamp shoe (52).

3. Apparatus for replacing guide pins according to claim 2, characterised by the fact that the device for the vertical displacement of tools has a base (70) of dimensions corresponding to the transverse dimensions of the cover (51) for the purpose of bearing against the latter and fastening it by means of centring and screwing studs (66, 71), a tubular part (72) fastened to the base (70) and having a vertical axis, in which tubular part is mounted axially a screw (77) provided at the top with a rotational driving means (78), and a support and drive assembly (82) fastened to a nut (84) engaged on the the screw (77), which assembly is guided for translation and fixed in respect of rotation in the tubular parts of the device, while the nut (84) engaged on the screw (77) permits a vertical translatory displacement of the support and drive assembly (82).

4. Apparatus for replacing guide pins according to claim 3, characterised by the fact that the support and drive assembly (82) comprises a gear (80) coaxial with the drive screw (77).

5. Apparatus for replacing guide pins according to claim 4, characterised by the fact that the screwing and unscrewing tool comprises a tubular body (90) whose inside diameter is larger than the diameter of the tubular part (72) of the vertical displacement device, and also a thick flange (91) coaxial with the tubular body (90) and in which are mounted for rotation a vertical shaft (92) carrying a pinion (96) coming into mesh with the gear (80) of the vertical displacement device when the screwing and unscrewing tool rests on the support and drive assembly (82) of the vertical displacement device, and also a vertical shaft (98), likewise mounted for rotation and carrying at the bottom a tool (107, 109) for the screwing and gripping of the guiding tube bolts (10), each of the shafts (92, 98) carried by the thick flange (91) being adapted to be rotationally operated by a manual tool, and the inside surface of the bore in the thick flange (91) extending the tubular portion carries sliding rings (94) for the rotary mounting of the screwing device on the device for the vertical displacement of the tool.

6. Apparatus for replacing guide pins according to claim 2, characterised by the fact that the device for the extraction and insertion of the guide pins (3) comprises a first tubular body (113) fixed detachably on the top of the cover (51) of the apparatus joining together the two parts of the guiding tube, the body (113) being fastened to a nut 114, and a second tubular body (115) of larger diameter which is mounted slidingly on the first body and carries a screw (118) which is mounted for rotation with its axis along the axis of the tubular body (115) and is engaged in the nut (114) fastened to the first tubular body (113), while the second body (115) also carries a flange (125) inside which are mounted for rotation shafts (126, 127) of great length which are directed vertically so that their threaded ends screw into the support plate (5) of the internal equipment, a vertical displacement of the guiding tube (2) being obtained by displacement of the first tubular body (113) in the second tubular body (115) through the rotation of the screw (118) engaged in the nut (114).

* * * * *

UNITED STATES PATENT AND TRADEMARK OFFICE
CERTIFICATE OF CORRECTION

PATENT NO. : 4,656,734

DATED : April 14, 1987

INVENTOR(S) : STYSKAL ET AL.

It is certified that error appears in the above-identified patent and that said Letters Patent is hereby corrected as shown below:

Title page: Item [75]

The name of the third inventor should be added as follows:

-- Georges Clar

Lyon, France --

"both of" should read --all of--

Signed and Sealed this

Twenty-third Day of January, 1990

*Attest:*

JEFFREY M. SAMUELS

*Attesting Officer*      *Acting Commissioner of Patents and Trademarks*